United States Patent
Fox et al.

(10) Patent No.: US 8,356,944 B2
(45) Date of Patent: Jan. 22, 2013

(54) TAPERED ROLLER BEARING WITH DISPLACEABLE RIB

(75) Inventors: Gerald P. Fox, Massillon, OH (US); Bruce C. Burner, Alliance, OH (US)

(73) Assignee: The Timken Company, Canton, OH (US)

( * ) Notice: Subject to any disclaimer, the term of this patent is extended or adjusted under 35 U.S.C. 154(b) by 1059 days.

(21) Appl. No.: 12/306,302

(22) PCT Filed: Jun. 28, 2007

(86) PCT No.: PCT/US2007/072323
§ 371 (c)(1),
(2), (4) Date: Dec. 23, 2008

(87) PCT Pub. No.: WO2008/005788
PCT Pub. Date: Jan. 10, 2008

(65) Prior Publication Data
US 2009/0202188 A1    Aug. 13, 2009

Related U.S. Application Data

(60) Provisional application No. 60/817,708, filed on Jun. 30, 2006.

(51) Int. Cl.
*F16C 19/38* (2006.01)
*F16C 19/52* (2006.01)
(52) U.S. Cl. ...... 384/557; 384/563; 384/571; 29/898.09
(58) Field of Classification Search .................. 384/557, 384/563, 564, 571; 29/898.09
See application file for complete search history.

(56) References Cited

U.S. PATENT DOCUMENTS

| 2,195,795 | A | * | 4/1940 | Baker ........................... 384/564 |
| 2,836,473 | A | | 5/1958 | Tydeman |
| 3,716,280 | A | | 2/1973 | Leibensperger et al. |
| 5,028,152 | A | | 7/1991 | Hill et al. |
| 6,135,641 | A | | 10/2000 | Smith |
| 2006/0018582 | A1 | | 1/2006 | Gradu et al. |

FOREIGN PATENT DOCUMENTS

DE    3239305    10/1982
WO    2006/014934    2/2006

* cited by examiner

*Primary Examiner* — Thomas R Hannon
(74) *Attorney, Agent, or Firm* — Polster, Lieder, Woodruff & Lucchesi, L.C.

(57) ABSTRACT

A bearing system (A) that supports a shaft (4) in a housing (2) includes two single row tapered roller bearings (6, 8) mounted in opposition. One of the bearings (8) compensates for thermal variations that would otherwise produce excessive preload in the system. It has a conventional cup (48) in the housing and tapered rollers (52) arranged in a single row along the raceway (54) of the cup. It also has a compensating assembly (50, 100, 110, 120, 130) on the shaft, and it includes a ribless cone (60) having a raceway (70) around which the rollers are organized, an axially displaceable rib ring (64) for positioning the rollers, a spring (66) for urging the rib ring against a stop surface (74) on the cone, and a compensating ring (68) formed from a material having a high coefficient of thermal expansion for displacing the rib ring against the force exerted by the spring when the temperature of the compensating assembly exceeds a prescribed set point temperature so as to reduce preload in the bearing system.

20 Claims, 5 Drawing Sheets

TAPERED ROLLER BEARING WITH DISPLACEABLE RIB

CROSS-REFERENCE TO RELATED APPLICATIONS

This application derives priority from and otherwise claims the benefit of U.S. Provisional Application 60/817,708, filed Jun. 30, 2006, and International Application PCT/US2007/072323, filed Jun. 28, 2007, and published under International Publication No. W02008/005788 A3, both of which are incorporated herein by reference.

TECHNICAL FIELD

This invention relates in general to tapered roller bearings and more particularly to tapered roller bearings having displaceable ribs that compensate for thermal differentials and to a method of controlling the setting in bearings.

BACKGROUND ART

A tapered roller bearing in its simplest form has a cup (outer race) that is typically fitted to a housing, a cone (inner race) that is typically fitted over a shaft, and tapered rollers (rolling elements) organized in a single row between the cup and cone. The cup and cone have tapered raceways that the rollers along their tapered side faces contact. In addition, the cone at the large end of its raceway has a thrust rib against which the large end faces of the rollers bear, and it prevents the rollers from being expelled from the annular space between the raceways. The thrust rib forms an integral part of the cone and cannot be displaced with respect to the cone.

A single row tapered roller bearing has the capacity to support or transfer radial loads and also axial loads in one axial direction. A bearing system composed of two single row tapered roller bearings mounted in opposition will transfer not only radial loads, but also axial loads in both axial directions, and will thus confine that which rotates both radially and axially. When mounted in opposition, the bearings may assume either the indirect configuration or the direct configuration. In the indirect configuration the small ends of the rollers of the one bearing are presented toward the small ends of the rollers for the other bearing. In the direct configuration the two bearings have the opposite orientation. Irrespective of the mounting configuration, the bearings may be adjusted to a desired setting by shifting only one of the races of either bearing axially. The setting may be various degrees of end play, in which clearances exist within the bearings, or various degrees of preload, which are characterized by the absence of clearances and increased dynamic stiffness for the axis of rotation. Another condition of line-to-line contact, often referred to as zero end play, is difficult to maintain. A light preload is preferred, but too much preload can damage the bearings.

Assuming that the two bearings are mounted in the indirect configuration and that the shaft and cones rise in temperature above the temperature of the housing and the cups, the differential thermal expansion between the shaft and cones, on one hand, and the cup and housing, on the other, produces two counteracting disruptions to the setting for the bearings. First, the axial expansion of the shaft tends to reduce or eliminate the slight preload. On the other hand, the radial expansion of the cones tends to increase the preload. The amount that one prevails over the other depends on the axial spread between the bearings, the diameter of the cones, and the angles of the raceways. Generally speaking, the radial expansion more than offsets the axial expansion, and when it does the bearings acquire a greater preload.

With directly mounted bearings, both the axial expansion and the radial expansion contribute to an increase in preload.

Stated somewhat differently, tapered roller bearings generate internal axial reaction forces due to the raceway angles. This typically means that a pair of single row tapered roller bearings are used in opposition so that the axial forces may be cancelled out against each other. Also, this allows the pair of bearings to carry external loads in any direction of application. At setup, a careful and precise axial location adjustment of the opposed races relative to each other is required. This process is called bearing setting and produces either endplay, line-to-line contact, or preload.

While a slight preload is desirable for a pair of single row tapered roller bearings mounted on opposition, too much preload is detrimental. Differential thermal expansion between the cones and cups and the shaft and housing to which they are respectively fitted can produce excessive preload. That preload may:
   reduce bearing life
   increase bearing noise and vibration
   increase bearing generated heat
   increase bearing torque
   increase damage to bearing lubricant
   increase roller contact stress
   increase cage damage Heretofore, efforts have been made to compensate for differential thermal expansion in bearing systems having opposed single row bearings. One involves installing a compensating ring having a high coefficient of thermal expansion behind one of the four races of the system. The thermal expansion of the compensating ring generally offsets the differential thermal expansion otherwise experienced by the bearing system, so that the system remains within acceptable tolerances. See U.S. Pat. No. 5,028,152. Another effort involves controlling the position of the thrust rib in one of the bearings with pressurized hydraulic fluid. See U.S. Pat. No. 3,716,280.

SUMMARY OF THE INVENTION

The invention resides in a compensating bearing having tapered rollers organized in a row between tapered raceways, with the axial position of the rollers and the setting for the system, of which the bearing is a part, being controlled by a rib ring that is displaced from a normal operating position by a compensating ring having a high coefficient of thermal expansion, so as to control the setting of the bearing. The invention also resides in a method of controlling a bearing setting with the displaceable rib ring and compensating ring.

DETAILED DESCRIPTION OF BEST MODES FOR CARRYING OUT INVENTION

Referring now to the drawings, a bearing system A (FIG. 1) exists between a housing 2 and a shaft 4 to enable one to rotate relative to the other about an axis X. For example, the housing 2 may remain fixed and the shaft 4 may rotate in it. On the other hand, the shaft 4 may take the form of a fixed spindle about which the housing 2 rotates, in which event the housing 2 may be a hub. The bearing system A includes two antifriction bearings-namely a single row tapered roller bearing 6 of conventional design and another single row tapered roller bearing 8 configured to compensate for differential thermal expansion between housing 2 and shaft 4 as well as between components of the bearings 6 and 8 themselves, a compensating bearing so to speak. The two bearings 6 and 8 are mounted in opposition to transfer radial loads between the housing 2 and shaft 4 and axial (thrust) loads in both axial directions as well. The system A as illustrated has the bearings 6 and 8 mounted in the indirect configuration. They could, with minor modifications, be mounted in the direct configuration. Moreover, the bearing 6 could take the form of some other antifriction bearing, such as an angular contact ball bearing designed to transfer both radial and axial loads, or it could even be another compensating bearing as is the bearing 8.

Figure 1:
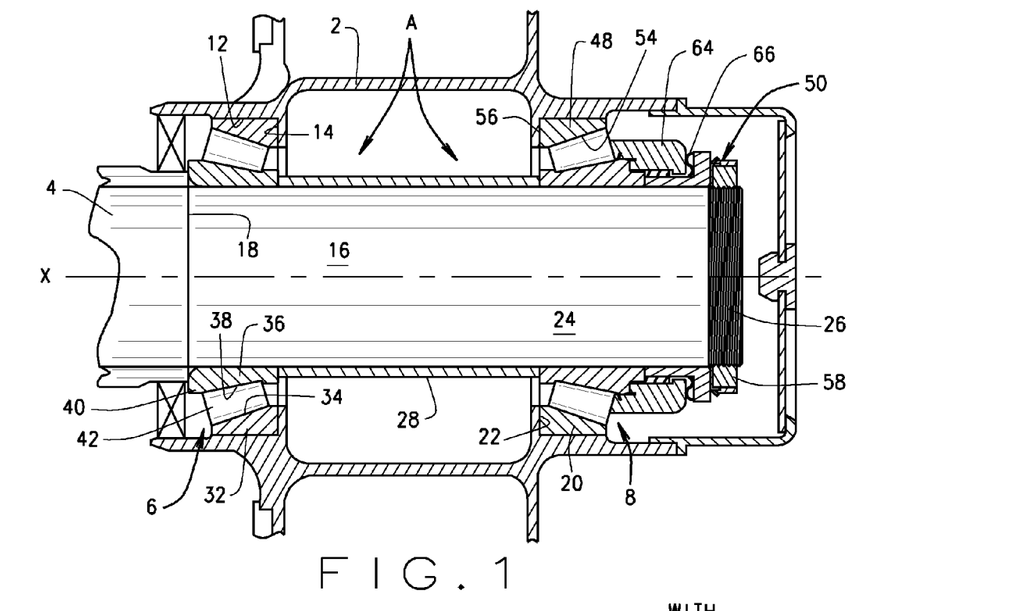
FIG. 1 is a sectional view of a bearing system interposed between a shaft and a housing and provided with a compensating bearing constructed in accordance with and embodying the present invention.

At the conventional bearing 6, the housing 2 has an internal bearing seat 12 and a shoulder 14 at the end of the seat 12. The shaft 4 has an external bearing seat 16 that leads to another shoulder 18. At the compensating bearing 8, the housing 2 has another internal seat 20 and shoulder 22. Here the shaft 4 has another external seat 24 that leads out to an external thread 26. Separating the two bearings 6 and 8 around the shaft 4 is a cone spacer 28.

Being a single row tapered roller bearing of conventional design, the bearing 6 has a cup 32 provided with a tapered raceway 34, a cone 36 provided with a tapered raceway 38 that leads up to a thrust rib 40 that is an integral part of the cone 36, and tapered rollers 42 that are located between the cup 32 and cone 36 where they roll along the raceways 34 and 38 with their large end faces against the thrust rib 40. Indeed, the thrust rib 40 prevents the rollers 42 from working up the raceways 34 and 38 and being expelled from the annular space between them. The cup 32 fits into the internal seat 12 of the housing 2 and against the shoulder 14 which serves to fix its axial position. The cone 36 fits over the external seat 16 on the shaft 4 and with its large end against the shoulder 18, which fixes its axial position. The cone spacer 28 bears against the small end of the cone 36.

The compensating bearing 8 includes (FIGS. 1 and 2) a cup 48 that fits into the housing 2, a compensating assembly 50 that fits over the shaft 4, and tapered rollers 52 organized in a single row between the cup 48 and the compensating assembly 50. The cup 48 may be conventional. As such, it has a tapered raceway 54 that is presented inwardly toward the axis X and a back face 56 that is perpendicular to the axis X. The cup 48 fits into the internal seat 20 of the housing 2 with an interference fit and with its back face 56 against the shoulder 22 at the end of the seat 20. The tapered rollers 52 are also conventional, and they lie in a single row along the raceway 54 of the cup 48 where they are also supported by the compensating assembly 50. Indeed, the compensating assembly 50 controls the exact axial position of the rollers 52 along the cup raceway 54, and that in turn controls the setting for the bearing system A.

The compensating assembly 50 fits over the bearing seat 24 on the shaft 4 between the cone spacer 28 and a nut 58 that is threaded over the external thread 26 at the end of the bearing seat 24. It includes (FIG. 2) a ribless cone 60 and a biasing spacer 62 that fit over the bearing seat 24 where they are clamped tightly together between the cone spacer 28 and the nut 58. In addition, the compensating assembly 50 has a shiftable rib ring 64 that is located generally around the cone 60 and biasing spacer 62, a biasing spring 66 that urges the rib ring 64 against the cone 60, and a thermal compensating ring 68 that exerts a force against the rib ring 64 in opposition to the force exerted by the spring 66, but only after the temperature of the compensating assembly 50 exceeds its normal operating temperature by a prescribed amount.

Figure 2:
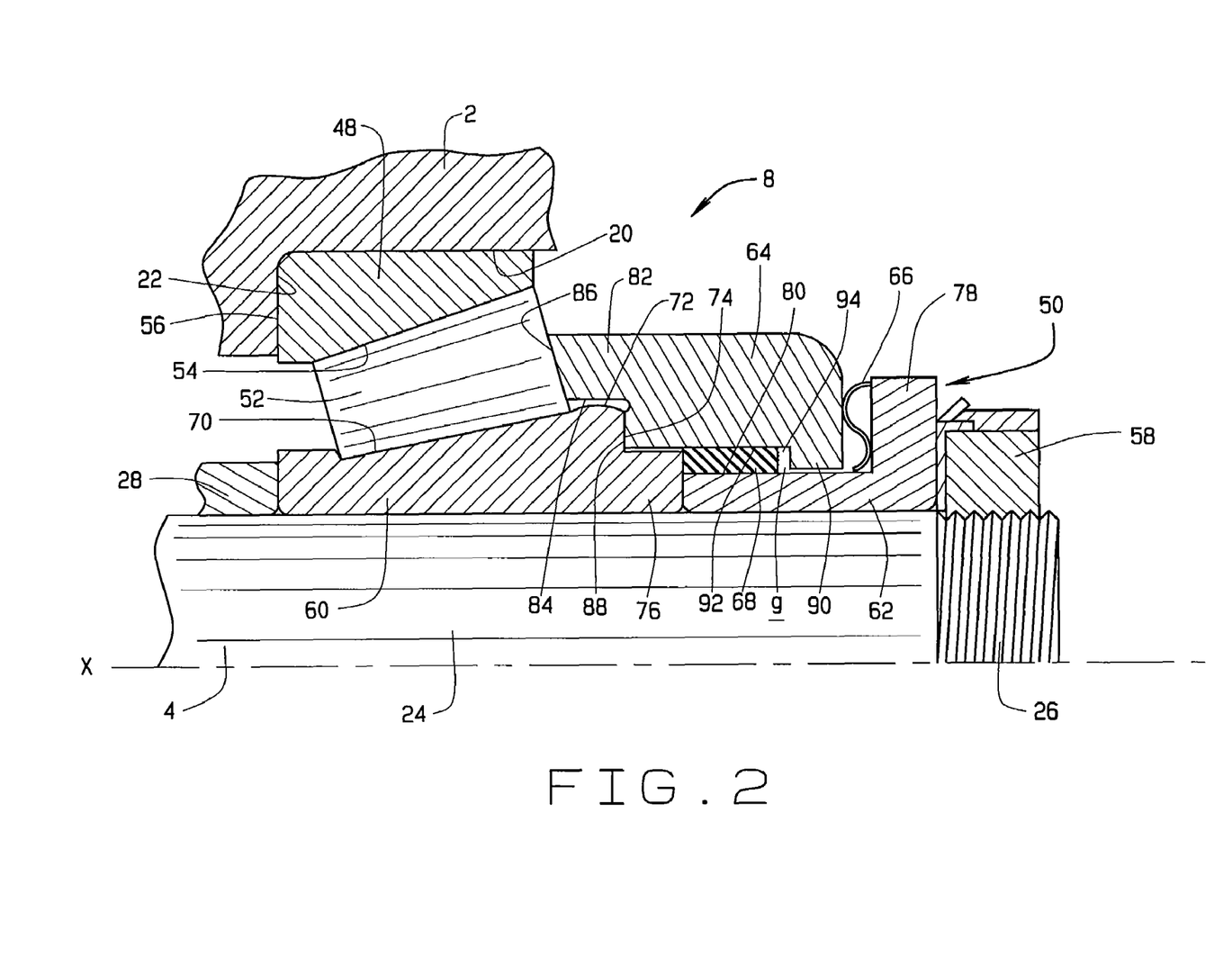
FIG. 2 is an enlarged half-sectional view of the compensating bearing.

The ribless cone 60 fits over the bearing seat 24 of the shaft 4 with a prescribed fit. It has a tapered raceway 70 that is presented outwardly away from the axis X and toward raceway 54 of the cup 48 and is inclined in the same direction as the cup raceway 54. The tapered rollers 52 are on apex, meaning that the conical envelopes in which their side faces lie as well as the conical envelopes in which the raceways 54 and 70 lie have their apices at a common point along the axis X. The raceway 70 of the cone 60 leads up to a crowned land 72 which in turn leads out to a stop surface 74 that is perpendicular to the axis X. The cone 60 also has an axial extension 76 that projects beyond the stop surface 74.

The biasing spacer 62 likewise fits over the bearing seat 24 of the shaft 4 with a prescribed fit, it being clamped tightly against the cone 60 by the lock nut 58. At one end it bears against the axial extension 76 of the cone 60. At its opposite end it has a flange 78 that projects radially outwardly behind the rib ring 64. Between the axial extension 76 of the cone 60 and the flange 78, the biasing spacer 62 has a cylindrical supporting surface 80 over which the compensating ring 68 fits.

The shiftable rib ring 64 fits loosely around the ribless cone 60 and the biasing spacer 62 where it has the capacity to shift axially a short distance. It has an axial rib 82 that provides a pilot bore 84 in which the crowned land 72 of the cone 60 is received. At the end of the bore 84 it has a rib face 86 against which the large end faces of the tapered rollers 52 bear. Thus, the rib 82 not only prevents the rollers 52 from being expelled from the annular space between the raceways 54 and 70, but also establishes the axial position of the rollers 52 along the raceways 54 and 70. The pilot bore 84 leads into an end surface 88 that normally abuts the stop surface 74 on the cone 60. At its opposite end the rib ring 64 has an inwardly directed radial rib 90 that surrounds cylindrical supporting surface 80 of the biasing spacer 62. Between the flange 90 and the end surface 88 is cylindrical confining surface 92 that surrounds the axial extension 76 on the cone 60 and the cylindrical surface 80 of the biasing spacer 62, it being spaced outwardly from the latter to provide an annular cavity 94. A small clearance exists between the confining surface 92 and the axial extension 76 and likewise between the radial rib 90 and the cylindrical supporting surface 80, so that the rib ring 64 can move easily over the cone 60 and biasing spacer 62.

The thermal compensating ring 68 occupies much of the annular cavity 94, it being supported around the cylindrical supporting surface 80 on the biasing spacer 62 and confined radially by the cylindrical confining surface 92 in the rib ring 64. Yet it is slightly shorter than the cavity 94 is long. In this regard, the end of the axial extension 76 on the cone 60 forms an abutment at one end of the cavity 94, whereas the radial rib 90 on the rib ring 64 forms an abutment at the opposite end of the cavity 94. Normally, when the compensating ring 68 at one of its ends is against one of the abutments a gap g exists between the other end of the ring 68 and the other abutment. The compensating ring 68 is formed from a material having a high coefficient ($\alpha$) of thermal expansion, considerably higher than the steel from which the cone 60, biasing spacer 62 and rib ring 64 are formed. Suitable materials include flurosilicon rubber, buna-N rubber, epichlorohydrin rubber, hypalon rubber and others. The compensating ring 68 fits snugly between the cylindrical surfaces 80 and 92 of the biasing spacer 62 and the rib ring 64, respectively, and as a consequence is constrained radially. When its temperature rises, it can expand only axially. The confinement has the effect of increasing the linear coefficient of thermal expansion by a factor of 3.

The biasing spring 66 is compressed between the flange 78 of the biasing spacer 62 and the end of the rib ring 64. It urges the rib ring 64 against the cone 60, normally holding the two firmly together at the stop surface 74 on the cone 60 and the end surface 88 on the rib ring 64. Typically, the force is 8 to 10 times the force normally exerted by the rollers 52 on the rib face 86 of the rib ring 64. Thus, the rib ring 64 is normally seated into a positive stop against the cone 60, with the stop being provided by the stop surface 74 on the cone 60. While the biasing spring 66 depicted is a wave spring having circumferential undulations, it may take other forms such as a plurality of compression springs spaced at circumferential intervals along the flange 78 or a single compression spring around the biasing spacer 62.

In the operation of the bearing system A, radial loads transfer between the housing 2 and shaft 4 at the two bearings 6 and 8. Axial loads in one direction transfer through the conventional bearing 6 and axial loads on the other direction transfer through the compensating bearing 8. At the conventional bearing 6 both the radial and axial loads transfer through the rollers 42 at the raceways 34 and 38 on the cup 32 and cone 36, respectively. At the conventional bearing 6 the shoulders 14 and 16 against which the cup 32 and cone 36 respectively bear take the axial loads transferred through that bearing 6. At the compensating bearing 8 the radial loads and axial loads transfer through the tapered rollers 52 at the raceways 54 and 70 on the cup 48 and cone 60, respectively. The shoulder 22 at the end of the bearing seat 20 in the housing 2 takes the axial loads applied to the cup 48. The nut 58 that engages the threads 26 on the shaft 4 and bears against the biasing spacer 62 takes the axial loads applied to the cone 60. Also, the nut 58, reacting against the threads 26, creates a condition of axial compression in the biasing spacer 52, the ribless cone 60, the cone spacer 28, the conventional cone 36 and shaft shoulder 18.

Figure 3:
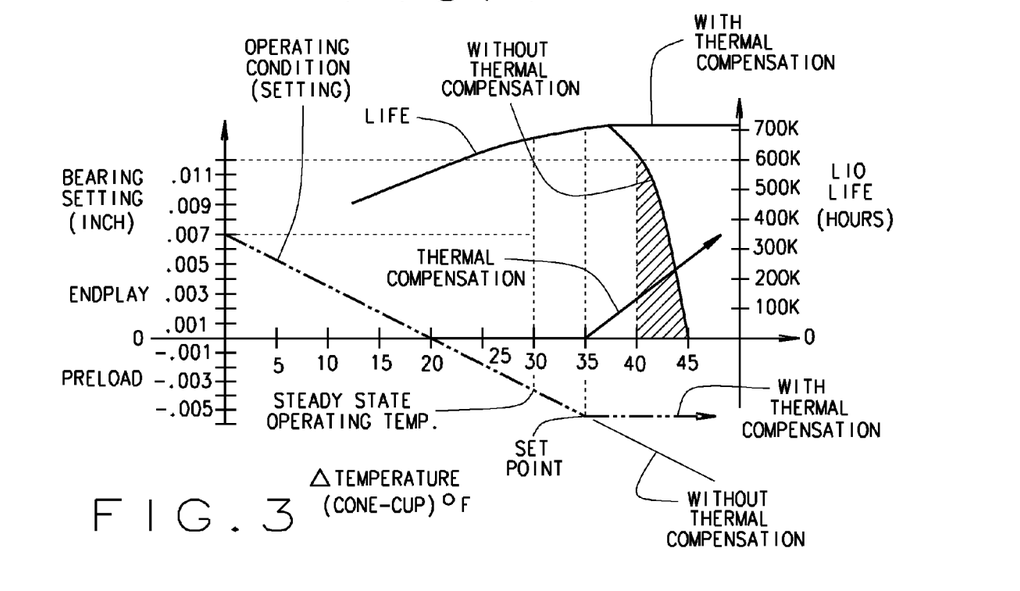
FIG. 3 is a graph depicting the life of the bearing system and operating condition for the bearing system as a function or temperature differential in the bearing system.

The compensating bearing 8 prevents excessive preload in the bearing system A and this extends the life of the bearing (FIG. 3). It requires consideration of several temperatures. First is the ambient temperature of the system A. This represents the temperature at which the system A, including its compensating bearing 8, is assembled. At that temperature the system A may exist in a state of end play or slight preload, but all components are essentially at the same temperature. Next is the steady state operating temperature. This is the temperature to which the compensating assembly 50 rises and remains during normal operation of the system A. Typically, it corresponds to the temperature of the shaft 4 at the compensating assembly 50, but is less than the temperature of the cup 48 and the region of the housing 2 in which the cup 48 fits. Thus, a temperature differential exists in the compensating bearing 8 when the compensating assembly 50 operates at its steady state operating temperature. The system A becomes tighter, typically assuming a slight preload. The compensating ring 68 remains inactive at the steady state operating temperature in the sense that it does not affect the position of the rib ring 64, because the gap g exists in the cavity 94 between the biasing spacer 62 and rib ring 64. Then there is the thermal set point temperature for the compensating assembly 50. At this temperature the compensating assembly 50 remains above the temperature of the cup 48 and housing 2, even more so. Moreover, at the thermal set point temperature the thermal compensating ring 68 has expanded enough to completely fill the cavity 94 and is on the verge of backing the rib ring 64 away from the cone 60. Beyond the thermal set point temperature, the compensating ring 68, by reason of further expansion, holds the rib ring 64 away from the cone 60, and this serves to displace the rib face 86 farther up the tapered raceway 70 on the cone 60 and reduce the preload in the bearings 6 and 8. Several operating states for the bearing system A deserve discussion.

State One:
Steady State Operation at Temperatures Below the Thermal Set Point Temperature 1. The normal operation of the bearing system A causes a temperature rise in the compensating assembly 50, including the compensating ring 68 of the compensating bearing 8, above temperature of the cup 48 for that bearing due to normal expected loads, speeds and torques until the desired and expected steady state operating temperature has been reached. This assumes that the bearing system A has either never yet exceeded the thermal rib set point, or that sufficient time has elapsed to zero out any thermal lag induced expansion.

2. The length of the thermal compensating ring 68 is such as to leave a small gap g, so that the effect of the thermal compensation is zero below the thermal set point temperature.

3. The biasing spring 66 is selected to produce typically 8 to 10 times the maximum normal contact force between the rollers 52 and axial rib 82 of the rib ring 64, so that the rib ring 64 is always positively seated against the stop surface 74 of the cone 60. This guarantees that the operation of the bearing system A at the desired normal steady state operating temperature is no different than for a traditional tapered roller bearing system.

State Two:
Thermal Compensation with Increasing Temperature Above the Steady State Operating Temperature 1. During operation larger than expected shaft speeds or application loads may produce added frictional heat from the contact between the rib face 86 of the rib ring 64 and the large end faces of the rollers 52. Also, the shaft 4 may conduct additional heat from gear tooth contact or other external heat generation sources. This can cause the ribless cone 60, rollers 42, movable rib ring 64, shaft 4, thermal compensating ring 68, and the biasing spacer 62—in short, the compensating assembly 50—to experience a further temperature increase. The thermal conductivity of the thermal compensating ring 68 is much lower than for the materials, normally steel, of the movable rib ring 64, rollers 52, cone 60, shaft 4, and the biasing ring 62. Consequently, a short time of thermal lag develops during which a slight increase in preload may occur due to the ∝ thermal linear coefficient of expansion for those materials.

2. The thermal compensating ring 68 reaches its new temperature. Its ∝ coefficient of thermal linear expansion is considerably larger than that of the other materials, and the ring 68 expands dramatically.

3. Because the material of the thermal compensating ring 68 is constrained from radial expansion, the volumetric expansion that occurs is transformed almost entirely into axial expansion and is proportional to 3 times the linear expansion, or 3 ∝.

4. No thermal compensation effect occurs, however, until the material rises to a temperature that allows the compensating ring 68 to expand completely through the gap g distance. That temperature is the thermal set point temperature. This causes the thermal effect to be disabled below the thermal set point temperature, giving it an on-off effect as well as a proportional temperature characteristic. The passive design acts in a way that is somewhat more directed, almost as if it was an active control. The net effect is of a preload limiter or bearing overload prevention device.

5. Once the gap g distance has been overcome, the volumetric expansion of the constrained thermal compensating ring 68 begins to exert axial force and continues to build up sufficient force to unseat the movable rib ring 64 from the positive stop surface 74 on the cone 60 as the ring 68 overcomes the biasing force of the spring 66. The moveable rib ring 64 and its axial rib 82 retract, thus compensating for the thermal expansion effects in the materials of the bearing 8 and shaft 4. (FIG. 3). However, the size of the gap g and the length of the thermal compensating ring 68 determine the temperature value for the thermal rib set point as well as the shape (slope) of the compensation effect.

a. Or, Slope (inch/degree F.)=3×∝×L where ∝ is the linear coefficient of thermal expansion for the material of the compensating ring 68;

b. L is the length of the thermal compensating ring 68 at the reference temperature of the mounted cup 48 and housing 2, and ∝ units are (inch/inch degree F.);

c. And, gap g (inch)=3×∝×L ((thermal set point temperature—steady state operating temperature));

d. The thermal set point temperature and steady state operating temperature represent states in which differences in temperature between the temperature of the cup 48 and housing 2 and the temperature at the compensating assembly 50 and shaft 4. The gap equation above uses the temperature difference between these two states which are themselves differential values; and    e. The compensating assembly 50 does not physically use differential temperatures to activate itself. The thermal compensating ring 68 simply responds to the heat flux input it either receives or loses from or to its surroundings. It will not know if that heat is due to elevated differential temperatures of the cone 60 and shaft 4 relative to the cup 48 and housing 2 or vice versa. Proper response of the compensating assembly 50 assumes that the application is understood well enough to determine which components of the system A will experience a temperature increase, so that the desired preload control may be obtained.

Therefore the choice of the activating temperature of the thermal rib set point, as well as the degree of thermal compensation after the set point has been reached, is based on the specific conditions of an application. Also, for the normal operation of the system A, the thermal set point may be offset any desired temperature differential above the steady state operating temperature to insure that the normal operation of the bearing system A is completely unaffected by the compensating assembly 50.

State Three:
Thermal Compensation with Decreasing Temperature

1. Once conditions no longer exist in the bearing system A that created the excess heat, the thermal compensating ring 68 begins to cool and reduce the thermal compensating effect which is no longer required or desirable. The compensating assembly 50 prevents bearing heat from increasing preload and becoming more severe (FIG. 3), but it does not remove the root cause for the heat production such as increase in speed or external load or external heat source. Because for most of the thermal compensating materials the thermal conductivity is much less than that of the outer materials in the compensating assembly 50 (typically steel), a condition of thermal lag or thermal hysteresis will occur. Assuming that the cool down process is slow enough, the cool down operating setting line will follow closely line M in FIG. 4, and the thermal lag effects on the bearing setting will be minimal.

Figure 4:
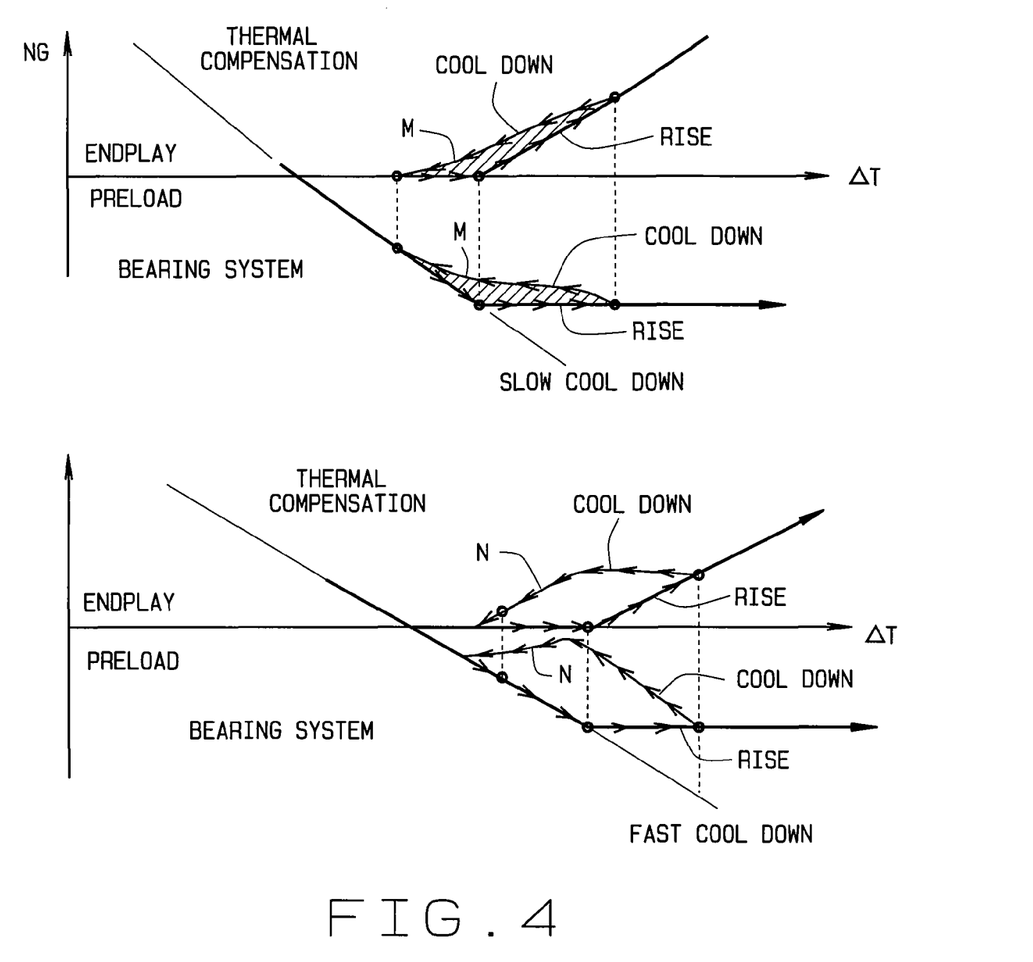
FIG. 4 shows graphs depicting operating conditions of the compensating ring and bearing system during temperature rise and cool down.

2. For situations which result in a fairly quick cool down of the bearing system A, the cool down of the thermal compensating ring 68 will experience a greater thermal lag to the other materials (FIG. 4). This would cause the bearing system A to operate for a short time at a slightly looser setting than desired. The cool down operating setting line that will actually occur will be like line N of FIG. 4. However, if the system operating point was a preload setting, the thermal lag is partly or almost completely offset by the original system preload. Thus, the preload may be temporarily reduced, but the system A may never enter the endplay condition at all. Should the system A enter endplay, it will be only until thermal equilibrium is re-established, at which time the system will return to the operating condition preload once again.

Variations of the compensating assembly 50 for the compensating bearing 8 are possible.

Figure 5:
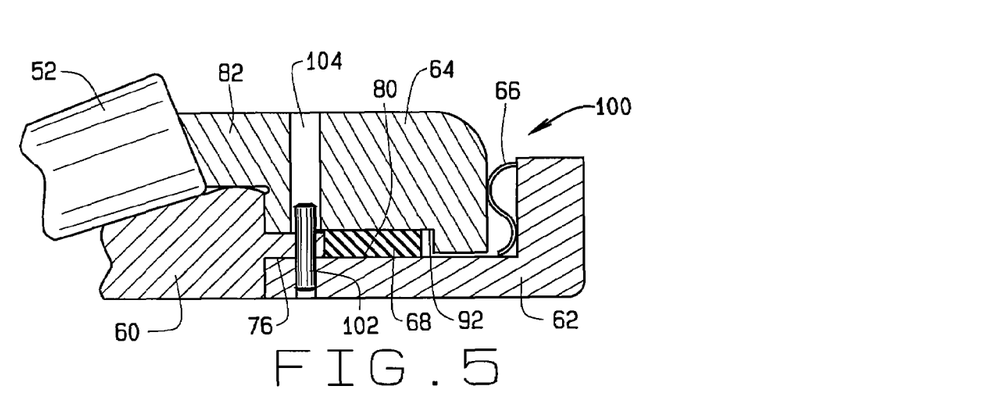
FIGS. 5-8 are a fragmentary sectional views of modified compensating assemblies for the compensating bearing of the bearing system.

In a modified compensating assembly 100 (FIG. 5), the ribless cone 60 and the biasing spacer 62 are coupled. To that end, the axial extension 76 on the cone 60 overlies the end of the cylindrical supporting surface 80 on the biasing spacer 62. Extended through the overlying extension 76 and into the underlying biasing spacer 62 is a dowel 102, it having been inserted through an aligned clearance hole 104 in the rib ring 64. The dowel 102, which is a coupling element, projects into the hole 104 to prevent the rib ring 64 from rotating against the cone 60, yet the clearance hole 104 is large enough to enable the rib ring 64 to displace axially after the thermal set point temperature is attained. The coupling of the cone 60 and biasing spacer 62 eliminates the need for the cone spacer 28.

Figure 6:
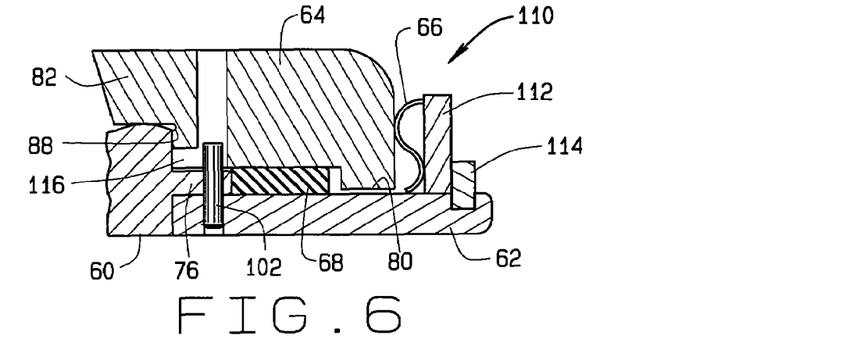

A further variation in the form of another modified compensating assembly 110 (FIG. 6) is easily disassembled. To that end, the flange 78 is replaced by a back-up washer 112 and a retaining ring 114. The washer 112 fits around the cylindrical supporting surface 80 of the biasing spacer 62, whereas the retaining ring 114 fits into a grove in the biasing spacer 62 and backs the back-up washer 112. Moreover, where the dowel 102 projects into the clearance hole 104, a slot 116 opens from the hole 104 through the end surface 88 of the rib ring 64 so that the dowel 102 does not interfere with withdrawal of the rib ring 64 over the biasing spacer 62.

Figure 7:
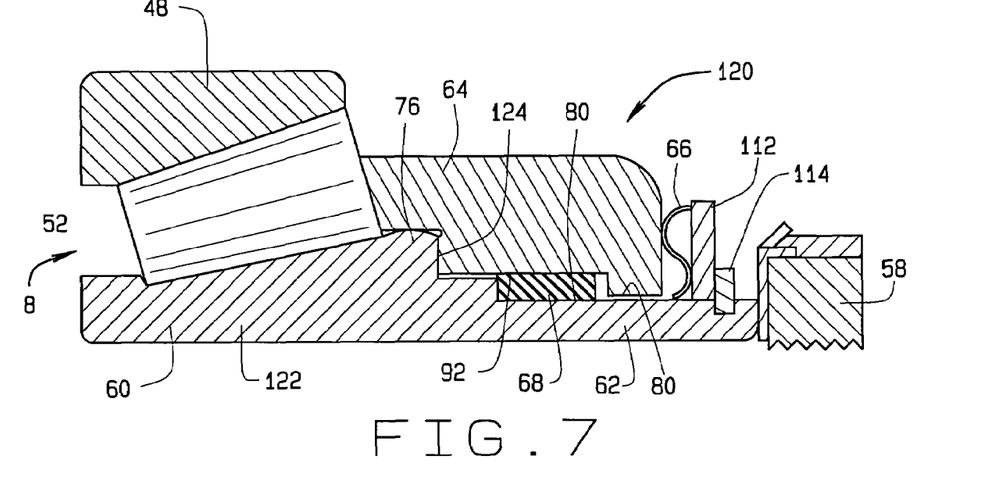

In still another compensating assembly 120 (FIG. 7), the cone 60 and biasing spacer 62 are formed integral, providing an integrated ribless cone 122. Its cylindrical supporting surface 80 leads up to a shoulder 124 against which one end of the thermal compensating ring 68 bears. The assembly 120 relies on a back-up washer 112 and retaining ring 114 to back the biasing spring 66. Like the compensating assemblies 100 and 110, the compensating assembly 120 requires no cone spacer 28 to hold it together.

Figure 8:
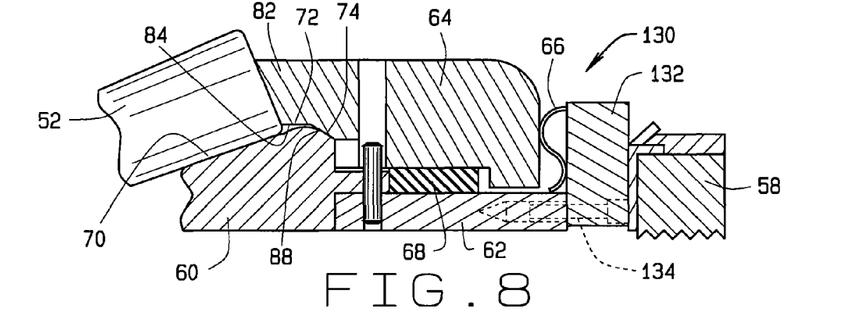

In yet another modified compensating assembly 130 (FIG. 8) the normally abutting surface 74 and 88 on the ribless cone 60 and rib ring 64, respectively, are inclined at an oblique angle with respect to the axis X, in effect taking on frusto-conical configurations centered on the axis X. The inclination of the surfaces 74 and 88 centers the rib ring 64 around the cone 60 when the surfaces 74 and 88 abut, which is during the normal operation on the bearing 8 at the steady state operating temperature. As a consequence, a greater clearance may exist between the crowned land 72 on the ribless cone 60 and the surface of the piloting bore 84 in the axial rib 82 of the rib ring 64. Only when the compensating assembly 50 operates above the thermal set point temperature may the rib ring 64 go slightly off center, but that is acceptable for the relatively short duration of thermal transients when the compensating assembly 130 actively provides thermal compensation. In lieu of an integral flange 78 for backing the biasing spring 66 or a separate back-up washer 112, the compensating assembly 130 utilizes a separate back-up plate 132 that is held against the end of the biasing spacer 62 with bolts 134 arranged in a bolt circle.

The inclined abutting surfaces 74 and 88 on the cone 60 and rib ring 64 of the compensating assembly 130 may be used with any of the compensating assemblies 50, 100, 110 and 120, and this holds true for the separate backing plate 132 as well.

Figure 9:
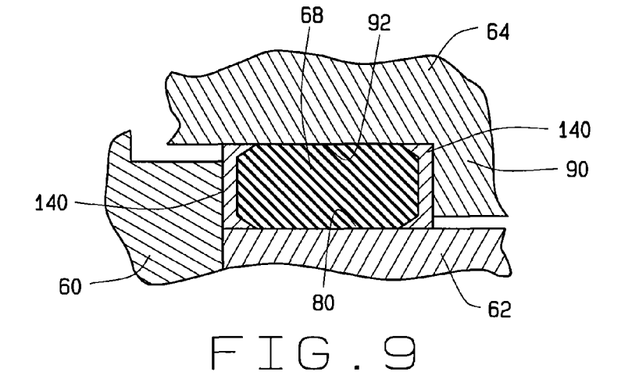
FIG. 9 is fragmentary sectional view of a compensating assembly containing a compensating ring having end caps.

The thermal compensating ring 68 may have end caps 140 (FIG. 9) bonded to its ends to prevent the somewhat resilient and flexible material of the ring 68 from extruding into the clearances between the axial extension 76 on the cone 60 and the cylindrical confining surface 92 on the rib ring 64 and from extruding into the clearance between the cylindrical supporting surface 80 on the biasing spacer 62 and the radial rib 90 on the rib ring 64. Most materials from which the thermal compensating ring 68 may be formed have a high coefficient of static friction. To aid in the capacity to transform volumetric expansion into linear expansion while reducing shearing stresses, the compensating ring 68 on its surfaces that contact the cylindrical surfaces 80 and 92 on the biasing spacer 62 and rib ring 64, respectively, may be provided with a thin friction-reducing coating or treatment.

Figure 10:
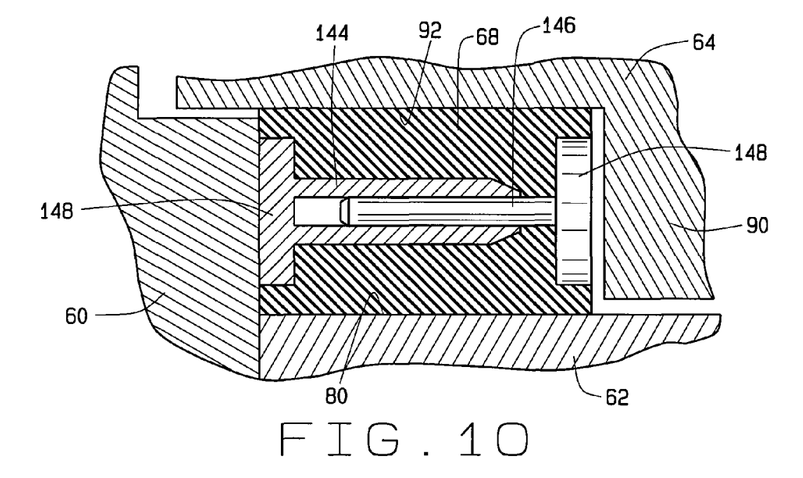
FIG. 10 is a fragmentary sectional view of a compensating assembly containing compensating rings having conductivity pins for enhancing transfer of heat into or out of the compensating ring.

Also, to enable the compensating ring 68 to respond more quickly to changes in temperature, particularly to temperature rises above the thermal set point temperature, the compensating ring 68 may be fitted with thermal conductivity pins 144 (FIG. 10) and 146 that telescope within the compensating ring 68 and have heads 148 that bear against the cone 60 and against the radial rib 90 of the rib ring 64 to transfer heat into or out of the thermal compensating ring 68. The pins 144 and 146 are formed from a material of relatively high thermal conductivity, such as stainless steel.

At the steady state operating temperature, the compensating ring 68 may completely fill the cavity 94 between the supporting surface in the biasing spacer 62 and the confining surface in the rib ring 64. With the compensating assembly so configured, it responds more rapidly to temperature excursions above the steady state operating temperature. This corresponds to a gap equal to zero and a set point temperature equal essentially to the steady state operating temperature.

The cup 48 may be formed integral with the housing 2, in which event its raceway 54 forms a surface of the housing 2.

The invention claimed is:

1. A tapered roller bearing for use as one of two opposed bearings that may be adjusted against each other along an axis to a desired setting, said bearing comprising:
    a cup having a tapered raceway presented inwardly toward the axis;
    a cone having a tapered raceway presented away from the axis and toward the raceway on the cup and having a stop surface presented at an angle with respect to the axis;
    a rib ring located opposite the stop surface of the cone and having a rib face located at the large end of the raceway on the cone;
    a spring exerting a force that urges the rib ring toward and normally against the stop surface on the cone;
    a thermal compensating ring positioned to exert on the rib ring a force that opposes the force exerted by the spring so as to urge the rib ring away from the stop surface on the cone when the temperature of the compensating ring exceeds a thermal set point temperature; and
    tapered rollers located between and contacting the raceways of the cup and cone and having their large end faces against the rib face on the rib ring.

2. A tapered roller bearing according to claim 1 wherein the thermal compensating ring lies between an abutment on the rib ring and an abutment on the cone; and wherein below the thermal set point temperature a gap exists between at least one of the abutments and the compensating ring.

3. A tapered roller bearing according to claim 2 wherein the compensating ring is shorter than the distance between the abutments when the temperature of the compensating ring is below the prescribed value.

4. A tapered roller bearing according to claim 1 wherein a supporting surface extends axially from the cone and the rib ring has a confining surface that surrounds the supporting surface; and
    wherein the compensating ring is constrained radially by the supporting and confining surfaces.

5. A tapered roller bearing according to claim 4 wherein the supporting and confining surfaces are cylindrical and parallel to the axis.

6. A tapered roller bearing according to claim 4 and further comprising a biasing spacer located in a fixed portion with respect to the cone and having a backing against which the spring bears; and
    wherein the supporting surface is on the biasing spacer.

7. A tapered roller bearing according to claim 6 wherein the cone and the biasing spacer are coupled.

8. A tapered roller bearing according to claim 7 wherein a coupling element extends through the cone and the biasing spacer to couple them.

9. A tapered roller bearing according to claim 6 wherein the cone and the biasing spacer are integrally united into a integral cone.

10. A typical roller bearing according to claim 1 wherein the cone has a land at the large end of its raceway and the rib ring has a rib that surrounds the land and carries the rib face.

11. A tapered roller bearing according to claim 1 wherein the stop surface is inclined at an oblique angle with respect to the axis, and the rib ring has end surface along which it abuts the stop surface, with the end surface being inclined at a similar oblique angle to the axis.

12. A bearing system comprising the tapered roller bearing of claim 1 and another bearing mounted along the axis in opposition to the tapered roller bearing of claim 1.

13. A tapered roller bearing for facilitating rotation about an axis, said bearing comprising:
   an outer tapered raceway presented inwardly toward the axis;
   a cone having an inner tapered raceway presented outwardly away from the axis and toward the outer raceway;
   tapered rollers arranged in a row between the inner and outer raceways;
   a rib ring having a rib face at the larger end of the inner raceway and being axially displaceable relative to the cone;
   a stop surface located in a fixed axial position with respect to the cone;
   a spring that urges the rib ring against the stop surface; and
   a compensating ring interposed between the stop surface and rib ring for controlling the axial location of the rib face on the rib ring, the compensating ring being formed from a material having a linear coefficient of thermal expansion greater than the linear coefficient of thermal expansion for the cone or the rib ring.

14. A tapered roller bearing according to claim 13 wherein the compensating ring normally exists at a steady state operating temperature during which it has no control over the position of the rib face, but does exert control after its temperature is elevated to a set point temperature.

15. A tapered roller bearing according to claim 13 wherein the compensating ring is constrained radially.

16. A tapered roller bearing according to claim 15 wherein the compensating ring is constrained by a cylindrical supporting surface that extends from the cone and by a cylindrical confining surface on the rib ring.

17. A bearing system comprising the tapered roller bearing of claim 13 and another bearing mounted in opposition to the tapered roller bearing.

18. A method of preventing excessive preload in a tapered roller bearing that facilitates rotation about an axis and has a cup and a cone provided with tapered raceways and tapered rollers arranged in a row between raceways, said method comprising:
   positioning a rib ring at one end of the cone, with the rib ring being axially displaceable relative to the cone and having a rib face at the large end of the cone raceway in contact with the large end faces of the rollers;
   urging the rib ring toward a normal operating position; and
   with a compensating ring formed from a material having a coefficient of thermal expansion higher than the material from which the cone and rib ring are formed, urging the rib ring away from the cone when the temperature of the rib ring rises so as to displace the rib face farther up the raceway of the cone and reduce preload in the bearing.

19. A method according to claim 18 wherein the compensating ring displaces the rib ring when the temperature of the compensating ring reaches a magnitude higher than the normal steady state operating temperature of the cone and the rib ring.

20. A method according to claim 18 and further comprising constraining the compensating ring radially.

* * * * *

UNITED STATES PATENT AND TRADEMARK OFFICE
CERTIFICATE OF CORRECTION

PATENT NO. : 8,356,944 B2  Page 1 of 1
APPLICATION NO. : 12/306302
DATED : January 22, 2013
INVENTOR(S) : Fox et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1060 days.

Signed and Sealed this

First Day of September, 2015

Michelle K. Lee
*Director of the United States Patent and Trademark Office*